(12) United States Patent
Borrett

(10) Patent No.: US 8,145,370 B2
(45) Date of Patent: Mar. 27, 2012

(54) STEERING SYSTEM FOR A MARINE VESSEL

(75) Inventor: John Robert Borrett, Christchurch (NZ)

(73) Assignee: CWF Hamilton & Co. Limited, Christchurch (NZ)

( * ) Notice: Subject to any disclaimer, the term of this patent is extended or adjusted under 35 U.S.C. 154(b) by 783 days.

(21) Appl. No.: 12/090,942

(22) PCT Filed: Sep. 22, 2006

(86) PCT No.: PCT/NZ2006/000248
§ 371 (c)(1), (2), (4) Date: Apr. 21, 2008

(87) PCT Pub. No.: WO2007/035119
PCT Pub. Date: Mar. 29, 2007

(65) Prior Publication Data
US 2009/0241823 A1    Oct. 1, 2009

(51) Int. Cl.
*G06F 7/00* (2006.01)
(52) U.S. Cl. .................................................. 701/21
(58) Field of Classification Search ............ 701/21, 701/33, 34, 41, 31.1, 538; 114/144 R, 151
See application file for complete search history.

(56) References Cited

U.S. PATENT DOCUMENTS

| | | |
|---|---|---|
| 3,715,571 A | 2/1973 | Braddon |
| 4,069,784 A | 1/1978 | Hedstrom |
| 4,595,867 A | 6/1986 | Cognevich |
| 4,611,549 A | 9/1986 | Kodera |
| 4,636,701 A | 1/1987 | Kodera |
| 4,799,163 A | 1/1989 | Wesner |
| 5,214,363 A | 5/1993 | Wisner et al. |
| 5,253,604 A | 10/1993 | Bohlin |
| 5,509,369 A | 4/1996 | Ford |
| 5,632,217 A * | 5/1997 | Ford et al. ............... 114/150 |
| 6,234,100 B1 | 5/2001 | Fadeley |
| 2002/0197918 A1* | 12/2002 | Aarnivuo ................. 440/53 |
| 2005/0092225 A1 | 5/2005 | Kaji et al. |

FOREIGN PATENT DOCUMENTS

| | | |
|---|---|---|
| EP | 0 423 901 | 4/1991 |
| WO | 92/06891 | 4/1992 |
| WO | 00/15495 | 3/2000 |
| WO | 2005/054050 | 6/2005 |

OTHER PUBLICATIONS

International Search Report dated Dec. 21, 2006 of International Application No. PCT/NZ2006/000248.

* cited by examiner

*Primary Examiner* — Kim T Nguyen
(74) *Attorney, Agent, or Firm* — Dann, Dorfman, Herrell and Skillman, P.C.

(57) ABSTRACT

A steering system for a marine vessel includes one or more steering devices operable to turn a marine vessel; a steering input device arranged to generate a desired turn rate signal; a rate sensor arranged to generate a turn rate signal indicative of vessel turn rate; and a control system configured to receive the vessel and desired turn rate signals and to control the steering device(s) to turn the marine vessel so as to minimise any difference between the signals.

24 Claims, 1 Drawing Sheet

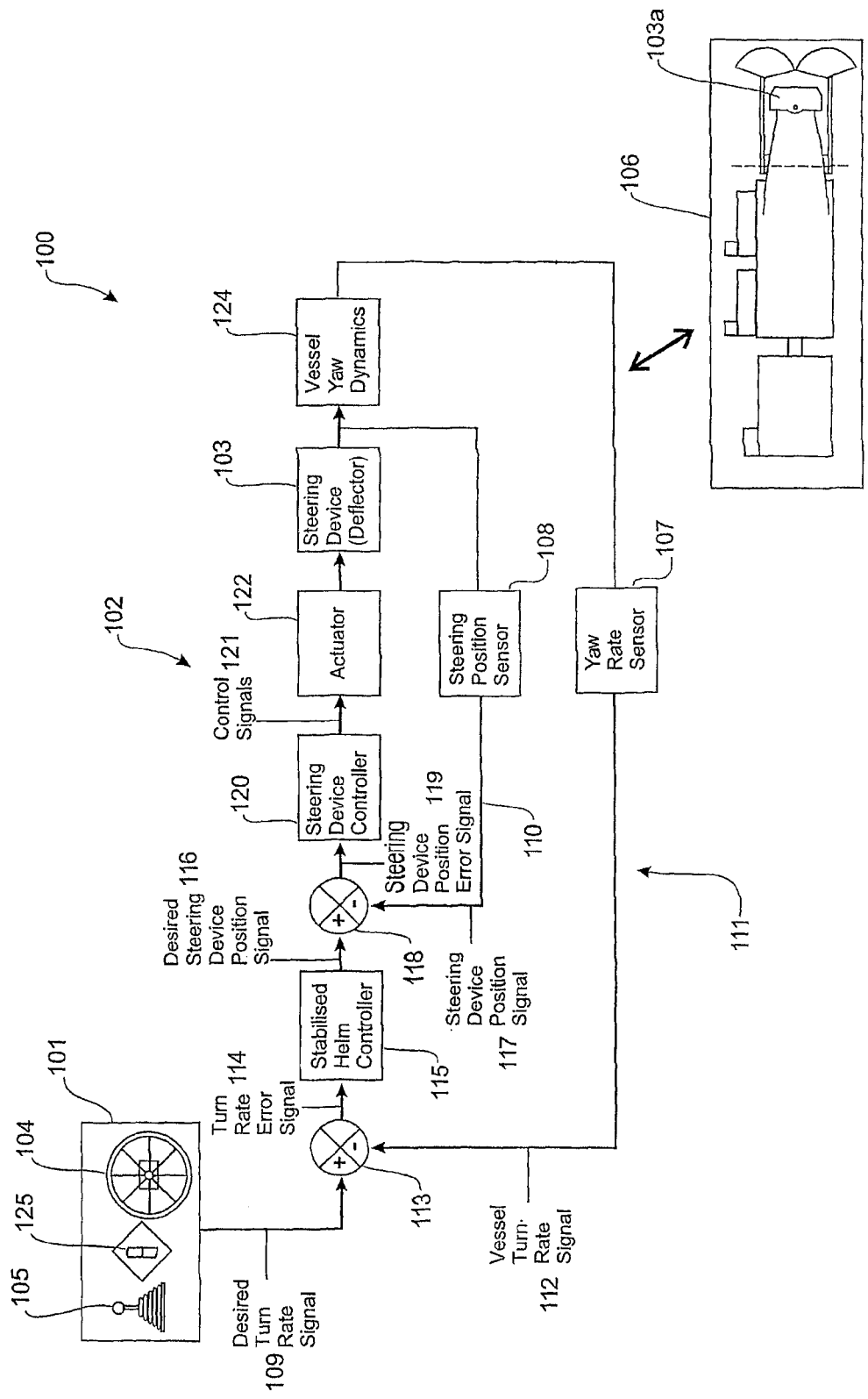

STEERING SYSTEM FOR A MARINE VESSEL

FIELD OF THE INVENTION

The present invention relates to a steering system for a marine vessel. In particular, although not exclusively, the steering system is suited to watetjet vessels.

BACKGROUND TO THE INVENTION

Various steering systems are available for marine vessels, boats, ships and the like. At a general level these systems usually comprise a helm wheel or steering joystick which controls one or more steering devices located at the stern of the marine vessel.

The type of steering device(s) utilised often depends on how the marine vessel is propelled through the water. The steering device for a propeller driven marine vessel may simply be a rudder, or the propeller itself may be pivotable in the case of an outboard motor or stern drive. For watetjet driven marine vessels, steering deflectors or nozzles which control the direction of one or more waterjets are usually provided as steering devices.

Many steering systems, particularly for larger boats or vessels, include an electronic control system which interfaces between tie steering input device, such as a helm wheel or steering joystick, and the actuator(s) for the steering device (s). These control systems are generally configured so that there is a fixed relationship between the amount that the steering input device is moved and the actual angle or position of the steering device(s).

With such electronic based steering systems, the pilot of a marine vessel directly controls the steering device(s) in order to turn the vessel via operation of the steering input device. However, because in practice there are always external disturbances such as wind, waves, tidal currents and vessel directional instabilities, the angle or position of the steering device (s) does not necessarily reflect how the vessel will actually turn. Often the pilot or helmsperson must constantly adjust the steering input device in order to maintain either a straight course or a particular desired rate of turn.

International patent application publication WO2005/054050 in one embodiment discloses a system for controlling a watercraft which has the objective of preventing overshoot when the watercraft is coming out of a turn. When the helmsperson returns the helm from a "command turn" position to a neutral or ahead position, the system then operates to prevent overshoot in coming out of the turn.

It is an object of the present invention to provide an improved steering system for a marine vessel, or to at least provide an alternative steering system.

SUMMARY OF THE INVENTION

In one aspect the invention broadly consists of a steering system for a marine vessel including: one or more steering devices operable to turn a marine vessel; a steering input device operable by a user to generate a desired turn rate signal; a rate sensor arranged to generate a turn rate signal indicative of vessel turn rate; and a control system configured to receive vessel and desired turn rate signals and to control the steering device(s) to turn the marine vessel so as to minimise any difference between the signals.

In a further aspect invention may be defined as broadly consisting of a steering system for a marine vessel including: one or more steering devices operable to turn the marine vessel; a steering input device operable by a user and having a position in which the device commands an ahead course for the vessel and which is operable to command turns away from an ahead course, the device generating to generate a desired turn rate signal; a rate sensor arranged to generate a turn rate signal indicative of the vessel turn rate; and a control system configured to receive the vessel and desired turn rate signals and to control the steering device(s) to turn the marine vessel so as to minimise any difference between the signals at least when the steering input device is operated to command a turn away from an ahead course.

In another aspect the invention broadly consists of a propulsion and steering system for a marine vessel including: one or more watetjet propulsion units, one or more steering devices operable to turn the marine vessel; a steering input device operable by a user to generate a desired turn rate signal; a rate sensor arranged to generate a turn rate signal indicative of the vessel turn rate; and a control system configured to receive the vessel and desired turn rate signals and to control the steering device(s) to turn the marine vessel so as to minimise any difference between the signals.

In a further aspect invention may be defined as broadly consisting of a propulsion and steering system for a marine vessel including: one or more watetjet propulsion units; one or more steering devices operable to turn the marine vessel; a steering input device operable by a user and having a position in which the device commands an ahead course for the vessel and which is operable to command turns away from an ahead course, the device generating to generate a desired turn rate signal; a rate sensor arranged to generate a turn rate signal indicative of the vessel turn rate; and a control system configured to receive the vessel and desired turn rate signals and to control the steering device(s) to turn the marine vessel so as to minimise any difference between the signals at least when the steering input device is operated to command a turn away from an ahead course.

Preferably the steering device(s) comprise one or more steering deflectors associated with the watetjet propulsion unit(s).

Preferably, the control system is arranged to control the steering device(s) so that the vessel turn rate signal converges with the desired turn rate signal.

The steering input device may be a helm wheel, steering joystick, tiller or manoeuvring controller for example. Alternatively, the desired turn ate signal could be provided by an autopilot, track keeping system.

Preferably, the control system is configured to prevent the marine vessel from spinning out on the water during a high speed turn. More preferably, the control system is arranged to monitor the vessel turn rate during a turn and to control the steering device(s) to prevent the marine vessel from spinning out.

In another aspect, the invention also broadly consists of a method for steering a marine vessel including the steps of: (a) operating a steering input device of the marine vessel to generate a desired turn rate signal representing a desired turn rate of the marine vessel; (b) generating a vessel turn rate signal indicative of the turn rate of the marine vessel; and (c) controlling one or more steering device(s) of the marine vessel to turn the vessel so as to minimise any difference between the vessel and desired turn rate signals.

A key difference between the system and method of the invention and that described in WO2005/054050 is that the system of the invention operates when the helm is moved away from a neutral or ahead position (the system may also operate when the helm is in an ahead position), and has as it's objective maintaining a commanded rate of turn during a turn, rather than preventing overshoot when the vessel is coming out of a turn on being commanded to return to an ahead course by movement of the helm to a neutral or ahead position.

This invention may also be said broadly to consist in the parts, elements and features referred to or indicated in the specification of the application, individually or collectively, and any or all combinations of any two or more said parts, elements or features, and where specific integers ate mentioned herein which have known equivalents in the art to which this invention relates, such known equivalents ate deemed to be incorporated herein as if individually set forth.

The invention consists in the foregoing and also envisages constructions of which the following gives examples only.

In this specification "vessel" is intended to include boats such as smaller pleasure runabouts and other boats, larger launches whether mono-hulls or multi-hulls, and larger vessels.

BRIEF DESCRIPTION OF THE DRAWING

A preferred embodiment of the invention will be described by way of example only and with reference to the accompanying FIGURE, which shows a schematic diagram of a preferred form steering system for a waterjet vessel propelled by a single waterjet unit.

DETAILED DESCRIPTION OF PREFERRED EMBODIMENTS

Referring to the accompanying FIGURE, the preferred form steering system 100 for a waterjet vessel includes a steering input device 101, control system 102 and steering device 103. The steering input device 101 may be, for example, a helm wheel 104 and/or steering joystick 105, which is/are operable by the pilot or helmsperson to turn the vessel via the steering device 103, for example the steering deflector 103a of a waterjet unit 106. It will be appreciated that other steering input devices could be used alternatively, such as for example a tiller or manoeuvring controller.

The control system 102 is an interface between the steering input device 101 and tie steering deflector 103a, and linked to the control system 102 is a yaw rate sensor 107 and a position sensor 108. The yaw rate sensor 107, for example a rate gyro, is fixed to the vessel and is configured to sense yaw motions of the vessel, while the position sensor 108 is arranged to sense the position of the steering deflector 103a of the waterjet unit 106.

In operation, the steering input device 101 generates a desired turn rate signal 109 in response to the helmsperson's operation of the helm wheel 104 and/or steering joystick 105. Essentially, the desired turn rate signal 109 represents the position of the steering input device 101 and ultimately the helmsperson's demanded turn rate. For example, if the helm wheel 104 is turned hard over, a desired turn rate signal 109 may be generated which represents a demanded turn rate of say 20 degrees/second or alternatively if the helm wheel 104 is amidships the demanded turn rate would be 0 degrees/second. The control system 102 receives this desired turn rate signal 109 and, in combination with the yaw rate sensor 107, position sensor 108 and steering deflector 103a, steers or turns the vessel in accordance with the desired turn rate signal 109.

The control system 102 is a rapid response modulating feedback system which regulates the vessel turn rate, which is sensed or otherwise at least approximately assessed by the yaw rate sensor 107, with the desired turn rate as indicated by the operation of the steering input device 101 by the helmsperson. The control system 102 is closed-loop and in the preferred form includes an inner feedback loop 110 as to the position of the steering deflector 103a and an outer feedback loop 111 as to the turn rate of the vessel. The operation of the preferred form control system 102 will now be described in more detail.

The outer feedback loop 111 feeds back a vessel turn rate signal 112, representing the sensed or assessed vessel yaw or turn rate indicated by the yaw rate sensor 107, to a summing junction 113 which also receives the desired turn rate signal 109 from the steering input device 101. The summing junction 113 is configured to calculate the difference or error, if any, between the vessel and desired turn or yaw rate signals 112, 109 and generate a turn rate error signal 114. A stabilised helm controller 115 module receives the turn rate error signal 114 and is configured to control the steering deflector 103a to minimise the error signal 114 so that the vessel turn rate converges with the desired turn rate.

To minimise the turn rate error signal 114, the preferred form stabilised helm controller 115 controls the position of the steering deflector 103a via a desired steering device position signal 116. For example, if the desired turn rate is 20 degrees/second to port and the vessel turn rate is only 15 degrees/second to port, the stabilised helm controller 115 will minimise the 5 degrees/second error by turning the steering deflector 103a further toward port.

To ensure that the steering deflector 103a is controlled and positioned in accordance with the desired steering device position signal 116 from the stabilised helm controller 115, the inner feedback loop 110 is utilised. The inner feedback loop 110 feeds back a steering device position signal 117 representing the position of the steering deflector 103a, as sensed by the position sensor 108, to a summing junction 118 which also receives the desired steering device position signal 116 from the stabilised helm controller 115. In similar fashion to summing junction 113 associated with the outer feedback loop 111, summing junction 118 is configured to generate a steering device position error signal 119 which represents the difference, if any, between the signals 116 and 117.

A steering device controller 120 module receives the steering device position error signal 119 and sends control signals to a steering actuator 122 which moves and positions the steering deflector 103a to minimise the error signal 119 so that the actual position of the steering deflector 103a converges with the desired position. In the preferred embodiment shown the steering device controller 120 sends control signals 121 to the steering actuator 122. The steering actuator 122 may comprise a hydraulic cylinder and associated hydraulic system or alternatively an electric or pneumatic actuator based system.

The vessel will generally turn in accordance with the position of the steering deflector 103a, although the ultimate vessel yaw/turn dynamics 124 will also depend on external disturbances such as wind, waves, tidal currents, trim and vessel directional instabilities.

The steering system 100 provides a benefit over known steering systems in that the helm wheel 104 and/or steering joystick 105 or other steering input device operated by the helmsperson is interpreted as a yaw/turn rate demand, rather than a steering deflector position demand. Essentially, the steering system 100 provides a controlled relationship between the position of the steering input device 101 and the yaw/turn rate of the vessel. The helmsperson does not need to make constant small adjustments to the helm wheel 104 and/or steering joystick 105 due to external disturbances while steering a straight course or making a turn. With the steering system 100, the vessel can be brought to a desired heading and this will be maintained over a reasonable period of time when the steering input device 101 is centered. Alternatively, a vessel will maintain a particular turn rate without constant manual adjustment for external factors. Furthermore, the steering system 100 is fully functional at high speed, during manoeuvring at low speeds and when the vessel is stationary. In particular, the steering system 100 provides predictable handling of vessels at low speeds and during maneuvering when vessels tend to have a slower turning response.

Another benefit of the steering system 100 is that it is capable of preventing loss of control of small, high powered watetjet vessels which may spin-out during a high speed turn, as can occur when a watetjet vessel is traveling at high speed and the helm wheel 104 or steering joystick 105 is suddenly put hard over. Unlike a vessel with a rudder or propeller, the stern of a watetjet vessel has virtually no grip on the water when turning fast and this can sometimes result in the stern suddenly skidding or spinning outwards. Steering systems of the invention have the capability to prevent this, since the high turn rate during the onset of the 'skid' will be detected and the steering will be automatically adjusted to prevent the spin-out i.e. the outer feedback loop 111 automatically regulates the vessel turn rate with the desired turn rate.

The steering system may be enhanced with additional vessel sensors, such as an accelerometer, roll and/or pitch angle sensor, and/or vessel speed sensor for example, to provide additional feedback on how the vessel is moving. It will be appreciated that the control system 102, or more particularly the stabilised helm controller 115, could be configured to also receive and respond appropriately to signals from any such additional sensors.

The control system 102 may, for example, be implemented in electronic circuitry as separate hardware modules, a custom chip with input/output ports, or in software which runs on a microprocessor or microcomputer. Furthermore, the steering system, and in particular the inner 110 and outer 111 feedback loops of the control system 102, are configured with fast response times in order to counteract the effects of vessels which are directionally unstable.

The steering system may have other features, for example a mode switch 125 may be provided to enable the helmsperson to switch the steering system 100 into a 'normal' node or a 'stabilised' mode. In the 'stabilised' mode the steering system 100 will function to stabilise unwanted yaw motions of the vessel as described above so that the steering input device 101 is interpreted as a yaw/turn rate demand. In a 'normal' mode the outer feedback loop 111 and stabilised helm controller 115 are disabled or bypassed resulting in a conventional steering system in which the steering input device 101 is interpreted as a steering deflector position demand.

The steering system of the invention is primarily intended as a manual steering system which allows a helmsperson to manually steer a vessel via operation of the steering input device i.e. the helm wheel 104 and/or steering joystick 105 is online or 'live'. In a further embodiment however, full or partial autopilot functionality could be integrated with the steering system. For example, partial autopilot functionality would enable a pilot to lock in a course heading or alternatively full autopilot capability could be provided by incorporating a heading sensor, such as a fluxgate or gyro compass, into the steering system. In another configuration, an autopilot system may be provided as an alternative steering input device to the helm wheel 104 and/or steering joystick 105 and a pilot could select the autopilot system to be the steering input device i.e. it would generate the desired turn rate signal 109. With full autopilot functionality, the steering system could guide the vessel through a predetermined course and the inner 110 and outer 111 feedback loops would help the autopilot maintain its course more effectively.

It will also be appreciated that the steering system of the invention can be implemented in a wide range of forms on a wide range of marine vessels. Details of the vessels, the individual control components and the propulsion units will be well known to a skilled reader. For example, the steering system could be configured to suit a vessel propelled by more than one watetjet unit or a vessel which has a steering device such as a rudder or propeller. Furthermore, the steering system should be calibrated for the size and response time of each marine vessel it is installed in.

The foregoing description of the invention includes preferred forms thereof. Modifications may be made thereto without departing from the scope hereof as defined in the accompanying claims.

The invention claimed is:

1. A manual steering system for a marine vessel including:
   one or more steering devices operable to turn a marine vessel;
   a manual steering input device that is manually operable by a user, the manual steering input device arranged to command an ahead course for the vessel and to command turns away from an ahead course, the manual steering input device being arranged to generate a desired vessel turn rate signal;
   a rate sensor arranged to generate a vessel turn rate signal indicative of a vessel turn rate; and
   a control system configured to receive the vessel turn rate signal and the desired vessel turn rate signal and to control the steering device(s) to turn the marine vessel so as to minimise any difference between the vessel turn rate signal and the desired vessel turn rate signal at least when the manual steering input device commands a turn away from an ahead course, wherein the control system is configured to minimise any difference between the vessel turn rate signal and the desired vessel turn rate signal whether the vessel is travelling at high speed or manoeuvring at low speed.

2. A manual steering system according to claim 1 wherein the control system is arranged to control the steering device(s) so that the vessel turn rate signal converges with the desired turn rate signal.

3. A manual steering system according to claim 1 wherein the manual steering input device comprises a helm wheel.

4. A manual steering system according to claim 1 wherein the manual steering input device comprises a joystick.

5. A manual steering system according to claim 1 wherein the rate sensor is a turn rate gyroscope.

6. A manual steering system according to any claim 1 wherein the control system is arranged to monitor the vessel turn rate during a turn and to control the steering device(s) to prevent the marine vessel from spinning out during a high speed turn.

7. A manual steering system according to claim 1 wherein the control system is arranged to generate a steering device position signal to control the position(s) of the steering device(s).

8. A manual steering system according to claim 7 further comprising position sensor(s) to sense the position(s) of the steering device(s).

9. A manual steering system according to claim 1 wherein the manual steering system is additionally operable in a mode in which the control system does not operate to minimise any difference between the vessel turn rate signal and desired vessel turn rate signal, wherein an output from the manual steering input device is interpreted as a position demand for the steering device(s).

10. A manual steering system according to claim 1 comprising two manual steering input devices, and wherein both steering input devices are arranged to generate a desired vessel turn rate signal, and the control system is configured to receive the desired vessel turn rate signal from either of the manual steering input devices and to control the steering device(s) to turn the marine vessel so as to minimise any difference between the desired vessel turn rate signal and the vessel turn rate signal at least when the manual steering input device commands a turn away from an ahead course, wherein the control system functions to minimise any difference between the vessel turn rate signal and the desired vessel turn rate signal whether the vessel is travelling at high speed or manoeuvring at low speed.

11. A manual steering system according to claim 10 wherein the manual steering input devices comprise a helm wheel and a joystick.

12. A manual steering system according to claim 1 wherein the control system is additionally configured to minimise any difference between the desired vessel turn rate signal and the vessel turn rate signal, when the manual steering input device demands a turn rate of zero degrees/second.

13. A propulsion and manual steering system for a marine vessel including:
   one or more waterjet propulsion units;
   one or more steering devices operable to turn the marine vessel;
   a manual steering input device that is manually operable by a user and having a position in which the device commands an ahead course for the vessel and which is operable to command turns away from an ahead course, the device being arranged to generate a desired vessel turn rate signal;
   a rate sensor arranged to generate a vessel turn rate signal indicative of the vessel turn rate; and
   control system configured to receive the vessel turn rate signal and the desired vessel turn rate signal and to control the steering device(s) to turn the marine vessel so as to minimise any difference between the vessel turn rate signal and the desired vessel turn rate signal at least when the manual steering input device is operated to command a turn away from an ahead course, wherein the control system is configured to minimise any difference between the vessel turn rate signal and the desired vessel turn rate signal whether the vessel is travelling at high speed or manoeuvring at low speed.

14. A propulsion and manual steering system according to claim 13 wherein the steering device(s) comprise one or more steering deflectors associated with the waterjet propulsion unit(s).

15. A propulsion and manual steering system according to claim 13 wherein the control system is arranged to control the steering device(s) so that the vessel turn rate signal converges with the desired vessel turn rate signal.

16. A propulsion and manual steering system according to claim 13 wherein the steering input device comprises a helm wheel.

17. A propulsion and manual steering system according to claim 13 wherein the steering input device comprises a joystick.

18. A propulsion and manual steering system according to claim 13 wherein the rate sensor is a turn rate gyroscope.

19. A propulsion and manual steering system according to claim 13 including a sensor arranged to indicate steering device position.

20. A propulsion and manual steering system according to claim 13 wherein the control system is arranged to monitor the vessel turn rate during a turn and to control the steering device(s) to prevent the marine vessel from spinning out during a high speed turn.

21. A propulsion and manual steering system according to claim 13 wherein the control system is arranged to generate a steering device position signal to control the position(s) of the steering device(s).

22. A propulsion and manual steering system according to claim 21 further comprising position sensor(s) to sense the position(s) of the steering device(s).

23. A propulsion and manual steering system according to claim 13 wherein the propulsion and manual steering system is additionally operable in a mode in which the control system does not operate to minimise any difference between the vessel turn rate signal and the desired vessel turn rate signal, wherein an output from the manual steering input device is interpreted as a position demand for the steering device(s).

24. A method for steering a marine vessel including the steps of: (a) manually operating a manual steering input device of a manual steering system of the marine vessel to generate a desired vessel turn rate signal representing a desired turn rate of the marine vessel, away from an ahead course; (b) generating a vessel turn rate signal indicative of the turn rate of the marine vessel; and (c) controlling one or more steering device(s) of the marine vessel to turn the vessel so as to minimise any difference between the vessel turn rate signal and the desired vessel turn rate signal, wherein the method includes minimising any difference between the vessel turn rate signal and the desired vessel turn rate signal both when the vessel is travelling at high speed and manoeuvring at low speed.

* * * * *